Patented July 26, 1932

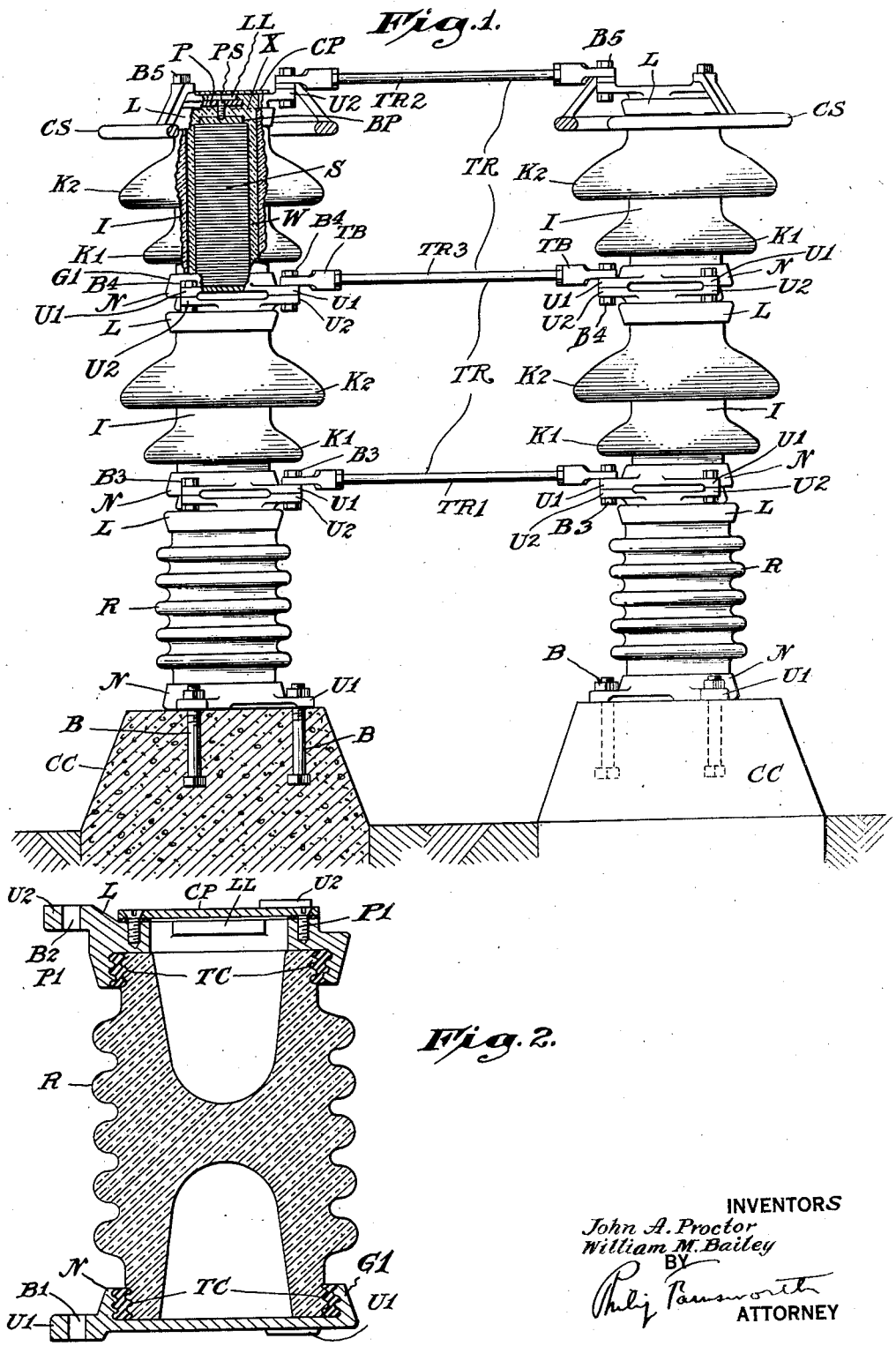

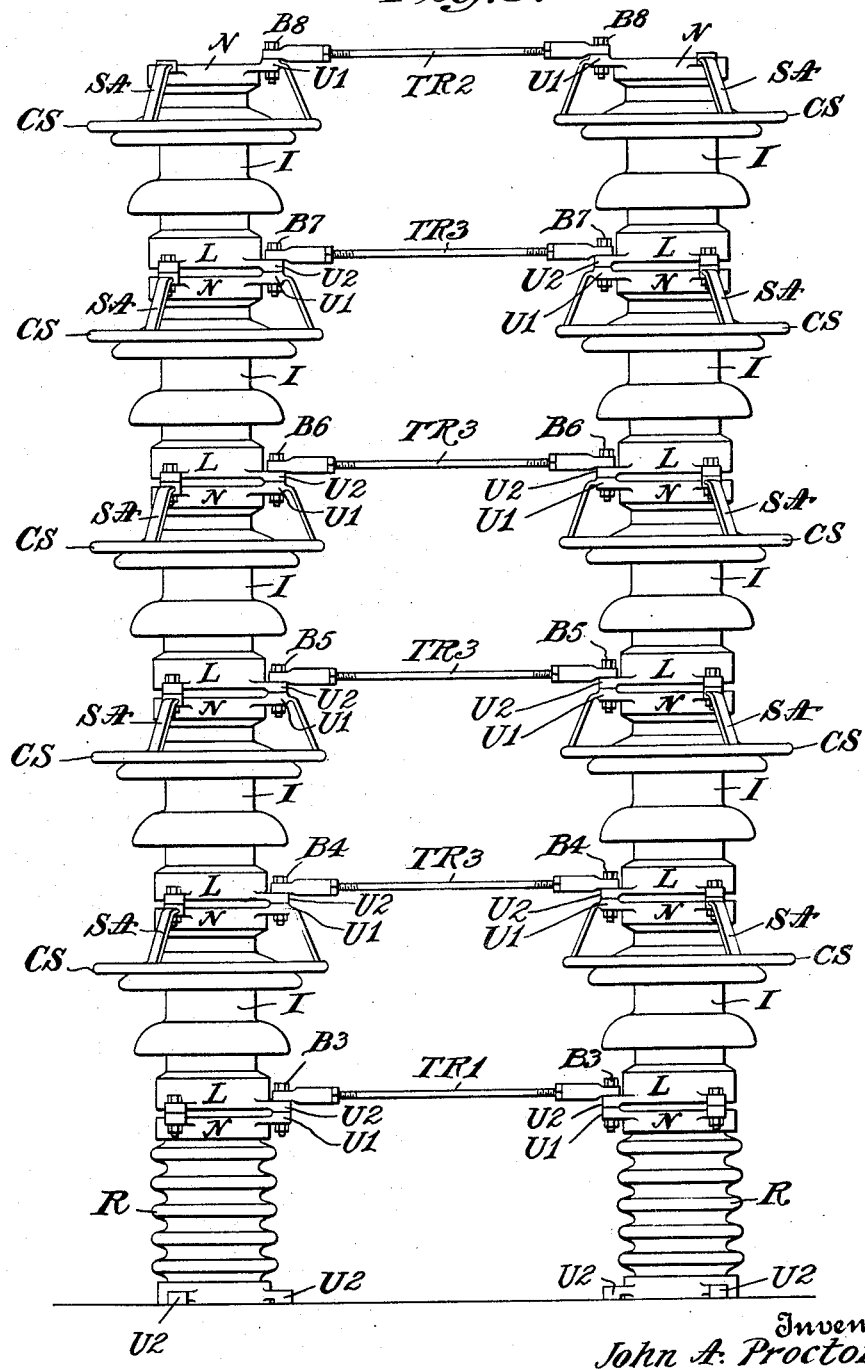

1,869,168

UNITED STATES PATENT OFFICE

JOHN A. PROCTOR, OF LEXINGTON, AND WILLIAM M. BAILEY, OF LYNN, MASSACHUSETTS, ASSIGNORS, BY MESNE ASSIGNMENTS, TO GENERAL ELECTRIC COMPANY, A CORPORATION OF NEW YORK

ELECTRICAL CONDENSER

Original application filed January 23, 1925, Serial No. 4,150. Divided and this application filed April 20, 1926. Serial No. 103,188.

This application is a division of our application Serial No. 4,150, filed Jan. 23, 1925.

This invention relates to improvements in electrical condensers, particularly in high potential condensers, and more particularly of the sheet-stack type, especially wherein the stack for high potential service comprises a plurality of sections insulated from one another by insulating sheets between the sections in the stack and connected in series with one another by connections outside the stack.

Among the various objects of the invention is that of providing a structure which is an improvement on the special type wherein the stack is contained in a substantially or more or less tubular casing which consists of insulating material preferably such as porcelain and which is provided with metal ends which serve to clamp the stack under high compression inside the casing, to complete the enclosure of the stack and to serve as electrical terminals at high potential difference which lie at opposite ends of the structure separated from one another by the insulating walls of such casing.

The invention consists of the various features of construction substantially as described hereinafter and as shown in the drawings, of which Fig. 1 is an elevation, partly in section, of a structure involving an assembly of condenser units in an organization which is unitary electrically and mechanically;

Fig. 2 is a section showing the construction of the mounting insulator R of Fig. 1; and Fig. 3 is a view similar to Fig. 1, but wherein each condenser unit is supplied with the corona shields CS shown in Fig. 1 only at the topmost condenser units.

In this invention, the casing for the condenser unit of the stack of units consists of tube I of porcelain, pyrex glass or other suitable vitreous or equivalent ceramic insulating material of sufficient mechanical tensile strength which is availed of in supporting and clamping the unit stack S of condenser sheets end-to-end of the stack inside each casing I which latter (as an insulator) is adjacent the sides of stack S. The open ends of this insulating casing are closed by metal end structures L and N which are electrically connected to the terminals of the condenser stack S inside casing I. The insulating property of the material of which casing I is composed permits the condenser stack S inside it to be of the well-known high potential type consisting of serially-connected sections separated from one another by insulating separators; casing I serving to separate condenser terminals L, N electrically from one another notwithstanding a high potential difference between them. When several such condenser units, with metal ends L, N, are stacked together as in Fig. 1, they also are electrically connected together in series via the contact between end terminal sections L, N of successive adjacent units. To form a single unit, the metal ends L, N thereof are suitably secured to casing I so as to be held thereto when casing I is put under tension by the end condenser-stack clamping within casing I.

The bottom metal end member N of a unit may be malleable iron and is one of the compression members of the clamping system for stack S, the bottom of which rests on N. Metal end N may be secured to casing I by cement between them in a construction like that shown for insulator R in Fig. 2 where the outside wall of the lower end of casing I is tapered outwardly and downwardly at TC and is corrugated, or substantially roughened or grooved as shown. Each end structure N has an upward annular flange G1, (Fig. 1) the inner wall of which is tapered inwardly and upwardly, i. e. oppositely to the stated taper TC of casing I, and similarly corrugated, roughened or grooved. The tapered and corrugated portion of casing I, if of porcelain, is unglazed so as to take the cement most effectively. With the construction, the only way thereafter to separate casing I and end N is to crush or dig out the cement from between their opposing tapered and roughened surfaces. Thus end N closes and seals the lower end of casing I. We recommend neat Portland cement.

Each end structure N has three integral lugs or feet U1, each extending laterally and with a bolt hole B1 in it.

On top of stack S is placed a metal bearing plate BP.

Stack S may be embedded in paraffin wax or submerged in oil; but owing to the insulation provided by vitreous (including ceramic) casing I between the metal ends L, N, the only function required of the wax or oil, if used, is to prevent flashover from stack section to stack section. Stack S may lie as close as desired to the interior wall of casing I, so that a compact over-all structure is permitted. The exterior wall of casing I is glazed, (vitreous) save (as stated above) at the tapered cemented portions. The inside wall of casing I is unglazed to permit intimate contact by wax or oil W to seal against access of moisture in the stack S and prevent leakage path between end terminals L, N.

The metal top construction of each condenser unit is as follows. A malleable iron collar L is applied to casing I as by the means shown and described above for end member N. Collar L has three integral lugs or feet U2, with bolt holes B2 (Fig. 1), as in the case of bottom end N, but U2 extends laterally and upwardly (Fig. 1), as shown more clearly in Fig. 2. The bolt holes in member L should be in alinement with those in N. The ends of casing I and of the metal end members L, N should be parallel to one another. Casing I may be provided with the corrugations, skirts or petticoats K1, K2 which increase the leakage distance of high potential flash over from one metal end L to another N over the glazed porcelain exterior of casing I. The glaze seals the porcelain pores (not present when casing I is of pyrex glass) and assists in shedding water and dirt. The skirts, in addition to increasing the flashover distance, also assist in shedding water and dirt and provide surfaces beneath them which are protected from access of moisture and dirt; and they serve to increase the mechanical strength of the porcelain casing, in this sense constituting a thick casing wall with or without excessive thickness of the rest of the casing wall. This condenser unit is a weatherproof and waterproof high potential condenser which is designed for outdoor service with adjacent high tension lines. It is an important feature of the corrugations in the form of skirts K1 and K2 that, as distinguished from the location of ordinary condenser casings under an insulating canopy, the spaces beneath and inside the skirts of condenser casing I do not permit of birdsnesting. Upper and wider skirt K2 serves also as rain-shield for the lower skirt K1 and lower portions of the casing; and lower skirt K1 serves as rain-shield for the lowest portions of the casing.

Between the top of stack S and the upper end of casing I is a space X which provides tolerance for stacks of varying length and substantially the same capacitance; pressure screw PS being sufficiently long for this purpose.

Collar L has the central hole shown, which is a little larger than that through casing I, so that in the process of assembly to be described, the steel pressure plate P can have its ends resting on top of the wall of casing I at the radially-inward portion thereof (section at left top Fig. 1).

Before the application of the cover-plate CP, the pressure-plate P is applied. This plate P (with screw PS) clamps stack S (via its casing) under high compression of the order of a thousand pounds more or less per square inch of active area of the stack. Plate P is of steel and is oblong with rounded ends (not shown), which respectively engage under two shoulders LL in diametrically opposite sides of the hole through collar L (shoulders illustrated in Fig. 2 in connection with insulator R). The shoulders LL of collar L project radially and inwardly from the inner wall of the central hole in collar L. With collar L cemented in place, plate P is set down on top of the wall of casing I and then is given a quarter-turn to swing it under the two diametrically opposite collar-shoulders LL. Then adjustable pressure screw PS is screwed down through the central hole in plate P and down against bearing plate BP. Further ajustment of screw PS pushes pressure plate P upwardly against the two opposite shoulders LL of collar L. Since collar L and lower end N are rigid with insulating portion I of the casing, said insulating portion thereby becomes the tension member of the stack-clamping system.

The condenser unit is now complete save for the cover-plate CP of steel for water and weather protection of the interior of the condenser. (Not shown clearly in Fig. 1 but like CP in Fig. 2.) This plate CP performs no compressing function. It is secured in place by an annular series of screws P1, which enter collar L near its inner wall.

Stack S in casing I may be electrically connected to metal ends L and N by copper strips soldered to foil-armatures projecting from end sections of the stack, said copper strips, in turn being fused to flexible wire cables soldered to cover-plate CP and end N respectively. Thus cover-plate CP and the rest of metal end structure L, and end N, are the opposite potential terminals of the condenser at high potential difference.

In practice, this condenser unit has dimensions larger by several times than those of the drawings. The outer surface of casing I may be corrugated in other ways than by the skirts K1, K2.

The condenser units hereof are designed particularly for outdoor use in arrangements of plural units as high potential, low-current condensers for coupling carrier-wave transmitting apparatus to a high potential transmission line. Assume a three-wire power line (for direct current with neutral wire or for three-phase alternating current) which is employed also to convey lower power carrier-currents at radio frequency, transmitted, say, from a radio transmitting transmitter and received at a distant radio receiving station; these carrier currents being used on one side of the power line, with earth connections therefrom via the radio apparatus. The line may carry power currents of the order of tens of kilovolts. The potential across each of a plurality of condenser units may be over twenty thousand volts. The function of the apparatus shown in Fig. 1 is to provide a good path for the radio frequency carrier currents but at the same time a poor path for the higher voltage line current, keeping the latter from access to and thereby injuring the radio apparatus including the transformer coils.

Another use is similar to that above described, but wherein the transformer coils are connected across two sides of the power line, the radio apparatus being connected to earth. Hence the condensers of Fig. 1 are located to protect both sides of the radio apparatus from the high potential power currents of the line.

Fig. 1 illustrates an assembly of a plurality of the above-described units for any such condenser use. To a cement foundation CC are secured two or more procelain or other vitreous mounting-insulators R, corrugated as shown, and constructed in detail as shown in Fig. 2. Insulator R may be solid, although preferably with cavities in its body as shown, to reduce its volume and cost. The outer surfaces at its ends are unglazed, corrugated, and tapered at TC similar to casing I of the condenser unit. Also in Fig. 2 tapered metal end members L and N are cemented to said tapered portions, each end member being similarly formed with three lugs or feet U1, U2 formed with bolt holes for bolts B (Fig. 1). Although two insulators R of Fig. 2 are shown in Fig. 1, there may be three conveniently located as at the points of a triangle. Bolts B (Fig. 1) are set in the cement foundation CC and the insulator R is secured to the foundation by the passage of these bolts through the three bottom feet U1 of bottom end member N. Upon insulators R are mounted stacks of condenser units, with bottom feet U1 registering with top feet U2 of insulator R, so that the lowermost condenser units are secured to insulators R by bolts B3 extending through the feet U1 and U2 of the condenser units and insulators respectively; and so that the second tier of condenser units, and the third tier, etc., of the same, are similarly secured to tiers of units below them. Also the various stacks of condenser units (each stack of units being insulated from ground by an insulator R) are electrically connected together and mechanically tied together by cross connectors TR, which provide equipotential distribution throughout the various stacks of units, thereby ensuring equal potential across each condenser unit so as to minimize the electrical strain on it and reduce liability to breakdown notwithstanding that the capacitance of the various units as manufactured may not be uniform or equal. That is, not only are the units of a lowermost unit-tier connected together by TR1, and also the highest unit-tier likewise by TR2, but an intermediate cross connector TR3 is provided for each intermediate unit-tier, so that all the units of the combination are connected in parallel with one another. Connectors TR, which may be metal turn-buckles as shown, also rigidly connect together mechanically the various stacks of units, in addition to permitting the assembly of the units to be electrically connected in various combinations of series, parallel and series parallel, and in addition to protecting the units electrically as above described. In detail, the ends of connectors TR are secured by the same bolts B3 etc. which secure the condenser units themselves in place via their feet U1 and U2, so that connectors TR become a mechanical unit with the insulators R and the condenser units, and with the whole units foundation CC via insulator R, providing against all mechanical and electrical stresses. Connections to line and to the radio apparatus are made from the top and bottom tier of condenser units. The internal assembly of each condenser unit is made through the end of casing I, which is provided with the metal end structure of the kind which in Fig. 2 is shown at the top. In practice, however, such top metal structure of Fig. 2 is placed at the other end of the casing (i. e., the two metal end structures but not the casing are reversed), so that with end member N of Fig. 2 at the top, as in Fig. 3, means is thereby provided which seals the casing against possibility of down-flow of moisture thereinto. Hence, in Fig. 1 the bottom member N illustrates preferably the metal end structure which in Fig. 3 is shown at the top; and in Fig. 1 top end member L illustrates the metal end structure which in Fig. 3 is shown at the bottom.

In Fig. 1 is shown on one condenser unit a metal ring CS with spider arms SA, which may be employed as a corona shield if desired on each unit for the purpose of reducing to a desired degree the high flashover characteristic of the unit which is obtained by the casing I when of porcelain or other vitreous material (including ceramics or the like) and with the skirts K1, K2 if desired.

That is, the invention permits the ready attainment of such a high flashover characteristic by insulating casing I that sometimes it may be desirable to reduce it as by such means as this ring CS, which characteristic otherwise, as the effect of insulating casing I, might be so great as to cause injury to the condenser unit stack inside casing I. The spacing between metal ring CS and the opposite metal end structure is made such that the flashover distance is so reduced that if the stack of units or a single stack-unit be subjected to extremely high potential difference, a discharge will take place paralleling insulating casing I but outside of it, instead of in the condenser stack itself inside the casing, thereby protecting the interior stack unit. It is to be noted that here we are dealing with unusually high potentials, so high indeed that under some conditions, and particularly when the insulator skirts are provided, the electrical distance between the ends of stack S (Fig. 1) and outside of the stack may be too high, due to casing I. When the insulator skirts are not employed, there is not as much probability of a need of ring CS. But said ring is useful, in combination with insulating casing I, whenever the applied potentials are very high. Even with the use of ring CS, the advantage of vitreous casing I are present, particularly in providing sufficiently strong insulating material instead of metal along the sides of the series-sectional stack S. As stated above, ring CS, in addition to serving as a protective discharge gap member for stack S, alone acts as a corona member in high potential service. Thus, when the disclosed apparatus is subjected to the kinds of service above described (as for radio carrier currents) it is subjected to potentials of one hundred kilovolts or more which cause corona effects or brushing, and the provision of ring CS reduces or eliminates such corona, by reducing electric field concentration. Thus ring CS serves the double purpose of (1) permitting an air break-down outside of the enclosed stack S and enclosure I itself in order to prevent break-down of stack S itself, and (2) usefully reduces or eliminates brushing caused by potential too low to cause break-down of stack S but high enough to cause corona in the lack of ring CS. The apparatus disclosed is used in exposed conditions where it is liable to be struck by lightning, and ring CS also serves to protect unit stack S from such discharge.

We particularly point out and distinctly claim the part, improvement or combination which we claim as our invention or discovery, as follows:

1. A high-tension condenser installation, comprising a plurality of stacks of insulation-sided metal-ended condenser units arranged end to end in the respective stacks; each metal end of each condenser unit being formed with laterally-extending securing means for electrically and mechanically connecting together the stacks and the units in each stack, the units in each stack being connected in series with one another, and the units in the different stacks being connected in parallel with one another.

2. In a condenser installation, the combination with a plurality of stacks of insulation-sided metal-ended condenser units arranged end to end in the respective stacks and mechanically and electrically connected together in series in the several stacks by way of said metal ends; and metal tie-rods connected to the metal ends of the condenser units in the different stacks, mechanically connecting the different stacks together and electrically connecting in parallel the condenser units in the respective stacks.

3. A high tension condenser construction comprising a plurality of condenser units each consisting of sectional condensers having leads connecting the sections in series with one another and having end sections of high potential difference each of said units comprising a casing consisting of an insulating portion located adjacent said series connections and comprising metal end portions electrically connected to the end sections of the encased series-sectional condenser; said units themselves being arranged end to end in a stack, with the metal casing-ends adjacent and electrically connected with one another; each adjacent metal casing-end having lateral portions registering with lateral portions of the adjacent metal casing-end for electrical and mechanical connection of adjacent units; and desired metal casing portions extending outside said insulating casing-portion from one metal casing-end toward the other metal casing-end of the same unit, decreasing the electrical separation (outide the insulating portion of the unit) of the two metal casing-ends of the unit from one another; said stack of units constituting a condenser of extremely high potential difference but protected against injury by excessive potentials.

4. A high-tension condenser construction including condenser sheets stacked together, a casing enclosing said stack and comprising an insulating central portion and two metallic end structures secured thereto and connected to the terminals of the enclosed stack; a conducting ring located outside the insulating portion of the casing and between the two metallic end structures; and radial arms connecting said ring to one of the metal end structures and means to connect the ring in parallel to the ring on a similarly constructed unit.

5. A high tension condenser casing comprising metal end structures connected to the terminals of an enclosed condenser and comprising also an intermediate insulating portion the ends of which are secured to said metal end structures, said insulating portion being formed with externally corrugated sides increasing the flash-over distance between the metal end structures, and one of said metal end structures being provided with a corona shield electrically connected thereto, extending outside the casing toward the other metal end structure and reducing the high flash-over characteristic due to said corrugation of the insulating portion of the casing.

6. A high tension condenser including a plurality of condenser stacks themselves arranged in a single composite stack, a casing enclosing each stack and consisting of two metal end structures and an intermediate insulating portion secured thereto, the end structures being electrically connected to the terminals of the enclosed stack; and adjacent end structures of casings adjacent one another in the composite stack being provided with means mechanically connecting such casings together and electrically connecting in series the stacks enclosed by such adjacent casings, constituting a high tension condenser; and corona shields electrically connected to one metal end structure of each individual stack-casing of the composite stack and extending outside the casing toward the other metal end structure of the same individual casing said corona shield being provided with means to electrically and mechanically connect them in parallel with the shields of a similar unit.

7. A high tension condenser comprising a large plurality of condenser sheets arranged in a long stack with their surfaces facing one another throughout said stack, said long stack being divided electrically into a smaller plurality of stack-sections each consisting of a plurality of condenser sheets, and a yet smaller plurality of groups of said sections being provided with enclosing casings located end to end in the long stack, the sections in each such enclosed group being stacked together end to end inside their casing, and electrical connections extending outside of and along the sides of each encased stack of sections and extending inside the casing and connecting the stacked sections so encased in series with one another, constituting each such enclosed stack as a high-tension unit; said casings each including an open-ended insulating portion and two metal end structures therefor secured thereto and closing the open ends thereof, said insulating portion extending along the sides of the encased sections and adjacent said serial connections thereof, and said two metal end structures for each casing being electrically and mechanically connected with the end sections of the enclosed group of sections, compressing the end faces of the enclosed group together; the adjacent metal end structures of adjacent casings being provided with means connecting them mechanically and electrically together thereby mechanically securing the successive casings together and electrically connecting in series the adjacent end sections of adjacent encased high tension units, and providing a compact rigid total stack whereof all the condenser sheets are under mechanical pressure.

8. A high tension condenser comprising a large plurality of condenser sheets arranged in a long stack with their surfaces facing one another throughout said stack, said long stack being divided electrically into a smaller plurality of stack-sections each consisting of a plurality of condenser sheets, and a yet smaller plurality of groups of said sections being provided with enclosing casings located end to end in the long stack, the sections in each such encased group being stacked together end to end inside their casing, and electrical connections extending outside of and along the sides of such encased stack of sections and extending inside the casing and connecting the stacked connections in series with one another constituting each encased stack as a high tension unit; said casings each including an open-ended insulating portion and two metal end structures therefor secured thereto and closing the open ends thereof, said insulating portion extending along the sides of the encased sections and adjacent said serial connections thereof, and said two metal end structures for each casing being electrically connected with the end sections of their enclosed group of sections; the adjacent metal end structures of adjacent casings being provided with means connecting them mechanically and electrically together thereby mechanically securing the successive adjacent casings together and electrically connecting together the adjacent end sections of adjacent encased high tension units; all whereby all the many sections of the long stack of very many condenser sheets are electrically connected in series with one another constituting a very high tension assembly, and all the very many sheets are enclosed and the long stack assembly is made compact and rigid by means of a minimum number of casings.

9. A high tension condenser comprising a stack of casings each consisting of two metal end structures and an intermediate insulating portion mechanically secured to the respective end structures; and inside each of said stacked casings a stack of condenser sheets electrically divided into a plurality of sections each consisting of a plurality of sheets; the sections in each encased stack being electrically connected in series with one another to constitute a high tension stack, and the end sections of such encased stack being electrically connected with the metal end structures of their casing; and adjacent metal end structures in the stack of casings being electrically connected to one another thereby connecting in series with one another the several encased high tension stacks and constituting a condenser stack of extremely high tension which is mechanically rigid due to the casings and compact due to the small number of casings relative to the number of serially connected sections.

10. A high tension condenser comprising a stack of casings each consisting of two metal end structures and an intermediate insulating portion mechanically secured to the respective end structures; and inside each of such stacked casings a stack of condenser sheets each divided into a plurality of sections each consisting of a plurality of sheets; the sections in each encased stack being electrically connected in series with one another to constitute a high tension stack, and the end sections of such encased stack being electrically connected with the metal end structures of their casing, said metal end structures highly compressing between them the encased series sectional stack; and metal end structures adjacent one another in the stack of casings being electrically connected to one another thereby connecting in series with one another the several encased high tension stacks and constituting a condenser stack of extremely high tension which is mechanically rigid due to the casings and compact due to the small number of casings relative to the number of serially connected condenser sections, all the individual condenser sheets being held under high mechanical compression.

11. In a high potential condenser, the combination with a plurality of stacks, each containing a plurality of high potential condenser units electrically and mechanically connected to one another in the stack; of means for providing equi-potential distribution throughout the various stack units and reducing liability of breakdown of the several units, said means comprising metal tie-rods electrically connecting in parallel the units of the respective stack-tiers, said tie-rods also inter-supporting the stacks of condenser units.

In testimony whereof we hereunto affix our signatures.

JOHN A. PROCTOR.
WILLIAM M. BAILEY.